United States Patent
Li

(10) Patent No.: US 6,374,895 B1
(45) Date of Patent: Apr. 23, 2002

(54) STRUCTURE OF A SINGLE-PIECE FITTING TYPE RETRACTABLE PROTECTIVE COVER

(76) Inventor: Manglang Li, No. 17-5, Lane 36, Sec 3, Da Guan Rd, Pan-Chiao City, Taipei Hsien (TW)

( * ) Notice: Subject to any disclaimer, the term of this patent is extended or adjusted under 35 U.S.C. 154(b) by 0 days.

(21) Appl. No.: 09/588,705

(22) Filed: Jun. 7, 2000

(51) Int. Cl.[7] .............................................. A47H 1/00
(52) U.S. Cl. ..................................... 160/89; 160/84.04
(58) Field of Search ............................... 160/89, 84.04, 160/84.01, 84.05, 168.1 R, 235, 236, 127; 384/15, 16; 409/134

(56) References Cited

U.S. PATENT DOCUMENTS

| | | | |
|---|---|---|---|
| 3,788,377 A | * | 1/1974 | Knowles .................. 160/84.04 |
| 3,824,890 A | * | 7/1974 | Zettler et al. ................. 90/11 R |
| 5,365,991 A | * | 11/1994 | Wright et al. ............ 409/134 X |
| 5,638,881 A | * | 6/1997 | Ruggles et al. ............ 160/89 X |

\* cited by examiner

Primary Examiner—David M. Purol
(74) Attorney, Agent, or Firm—Bacon & Thomas, PLLC

(57) ABSTRACT

An improved structure of a single-piece fitting type retractable protective cover including a retractable body, fitting plates, and fitting vanes. The retractable body is retractable and substantially wavy, and includes a plurality of w-shaped sections. Each fitting plate is nailed to the right side of the right inside angle of each W-shaped section of the retractable body. The fitting plate has a front projecting shaft, and each fitting vane has a head end recess that can be fitted to the front projecting shaft of the fitting plate from either end and that can swing forwardly and rearwardly along the front projecting shaft. The fitting vane further has a tail end, the angle of which can be changed at will. In the invention, individual fitting vanes can be easily replaced when damaged.

1 Claim, 1 Drawing Sheet

STRUCTURE OF A SINGLE-PIECE FITTING TYPE RETRACTABLE PROTECTIVE COVER

BACKGROUND OF THE INVENTION

1. Field of the Invention

The present invention relates generally to an improved structure of a single-piece fitting type retractable protective cover and more particularly to a retractable protective cover adapted to be used on cutting machines to prevent metal scraps from damaging the machine.

2. Description of the Prior Art

In the prior art, each protective vane is individually suspended on a retractable body using a U-shaped strap. However, since such a structure cannot be individually replaced when damaged, the maintenance cost will be high.

Besides, since prior art structures have various specifications depending on their size, if some of the vanes are damaged, it is difficult to replace them individually, and the entire structure has to be replaced, which is costly.

FIG. 2 shows the structure of the prior art. A retractable cover 10 includes a retractable body 11 having a plurality of W-shaped sections; a U-shaped fitting strap 12 nailed to the retractable body 11, and a plurality of vanes 13. The fitting strap 12 passes through both sides of the upper side of each vane 13 so that the vanes 13 can be suspended on the retractable body 11. If the vanes 13 in the middle are damaged by splattering scraps of metal so that they are no longer usable, the entire protective cover 10 has to be replaced due to its complicated construction, which is expensive.

SUMMARY OF THE INVENTION

According to the present invention, an improved structure of a single-piece fitting type retractable protective cover comprises a retractable body, fitting plates, and fitting vanes. The retractable body is retractable and substantially wavy, and includes a plurality of W-shaped sections. Each fitting plate is nailed to the right side of the right inside angle of each W-shaped section of the retractable body. The fitting plate has a front projecting shaft, and each fitting vane has a head end recess that can be fitted to the front projecting shaft of the fitting plate from either end and that can swing forwardly and rearwardly along the front projecting shaft. The fitting vane further has a tail end the angle of which can be changed at will. By means of the present invention, individual fitting vanes can be easily replaced when damaged.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

Figure 2:
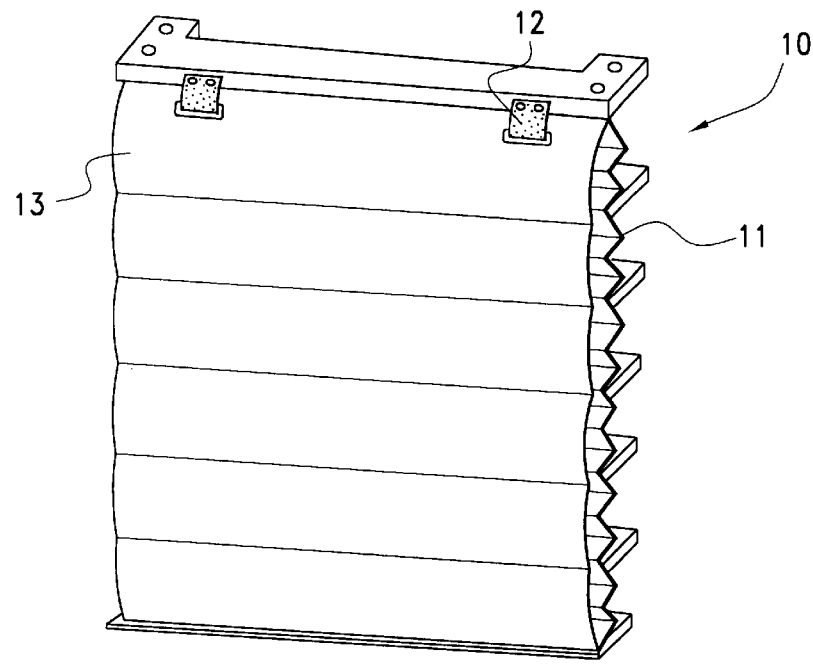
FIG. 2 is a schematic view of the structure of the prior art.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 1:
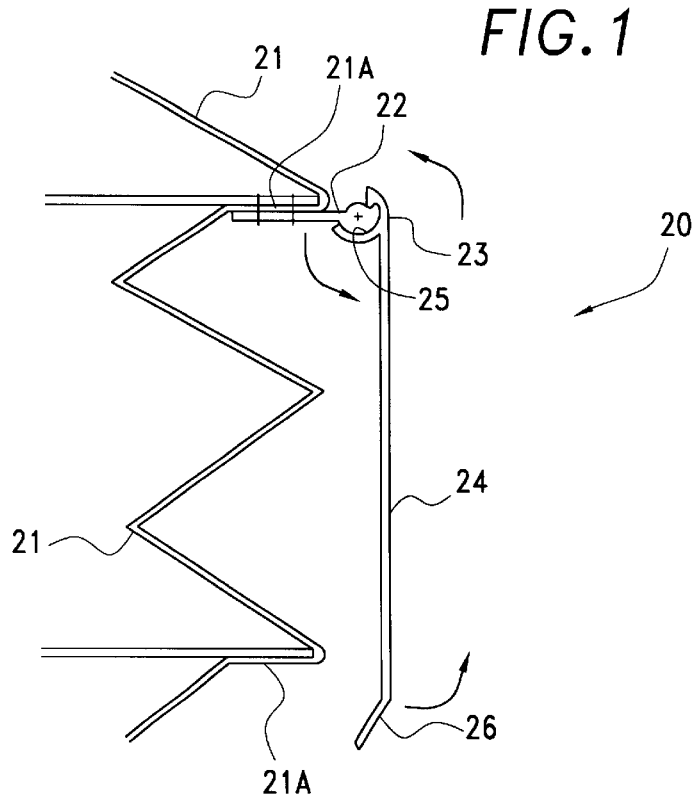
FIG. 1 is a schematic view of the structure of the present invention.

Referring to FIG. 1, the present invention is shown to comprise a retractable protective cover 20 including a retractable body 21 having a plurality of W-shaped sections each having an upper portion 21A, and a plurality of fitting vanes 24. A fitting plate 22 is pre-nailed to each W-shaped section of the retractable body 21 at a respective upper portion 21A. The fitting plate 22 has a front projecting shaft 23. A head end recess 25 of a fitting vane 24 can fit thereon from either the left or the right end, and the fitting vane 24 can swing forwardly and rearwardly along the front projecting shaft 23. The fitting vane 24 is configured such that it can swing on the front projecting shaft 23 without falling, and has a tail end 26 that can have more angular changes depending on the demand of the machine. If any one of the fitting vanes 24 is damaged, it can be removed from either the left or the right side and replaced with a new one. Therefore, maintenance is very convenient.

The invention is naturally not limited in any sense to the particular features specified in the foregoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An improved structure of a single-piece fitting type retractable protective cover, the cover comprising:

a retractable body comprising a series of W-shaped sections connected at adjacent ends thereof, each of the W-shaped sections comprising an upper portion;

fitting plates each nailed to a respective one of the upper portion of the W-shaped sections, each of the fitting plates including a front projecting shaft extending out of the W-shaped sections; and fitting vanes each comprising a head end recess, each of the head end recesses engages a respective one of the front projecting shafts along the longitudinal length of the respective one of the front projecting shaft, each of the fitting vanes further comprising a tail end, the fitting vanes are rotatable toward or away from the W-shaped sections along the longitudinal lengths of the front projecting shafts.

* * * * *